Sept. 27, 1966 M. MUELLER 3,275,121

LID ARRANGEMENT APPARATUS

Filed Nov. 19, 1964 3 Sheets-Sheet 1

Inventor
Martin Mueller
By Dressler, Goldsmith, Clement, Gordon & Ladd
Attorneys Sept. 27, 1966  M. MUELLER  3,275,121
LID ARRANGEMENT APPARATUS
Filed Nov. 19, 1964  3 Sheets-Sheet 3

Inventor
Martin Mueller
By Dressler, Goldsmith, Clement, Gordon & Ladd
Attorneys

United States Patent Office 3,275,121
Patented Sept. 27, 1966

3,275,121
LID ARRANGEMENT APPARATUS
Martin Mueller, Chicago, Ill., assignor to
Seymour C. Graham
Filed Nov. 19, 1964, Ser. No. 412,510
7 Claims. (Cl. 198—33)

This invention relates to a lid arrangement system, and, more particularly, to a method and apparatus for automatically arranging and orienting lids from a random collection.

A great need has developed in the packaging industry for a system that is capable of capping containers in an automatic operation, without the necessity of manually stacking the container lids. It is desirable that the operator merely dump a large number of lids in a hopper, and that the lids be automatically arranged and oriented for capping.

The container lids to which the invention is most suited are generally cylindrical in shape and comprise a "closed" side, with a substantially perpendicular extending edge or skirt forming an "open" side which faces the container bottom.

In accordance with the invention, there is provided a method and an apparatus for automatically supplying container lids in proper orientation for subsequent placement on a container, from a random, disoriented supply. Some of the lids in the supply are continuously picked up and lifted on platforms at an inclined angle with respect to the horizontal, with the edges of the lids resting on the platforms. The platforms are then raised vertically under conditions to assure that only lids having their closed side in juxtaposition with an adjacent backplate will be balanced on the platforms, and the others will necessarily fall. The lids remaining on the platforms are then distributed for placement on containers.

The apparatus forming an illustrative embodiment of the invention includes a hopper for containing a large number of lids. A plurality of horizontal extending platforms in parallel with one another are associated with the hopper for conveying the lids contained therein. Each of the platforms is wide enough to hold a plurality of lids. The platforms are driven upwardly through a path including (a) a lower section for receiving the lids wherein the motion of the platforms is at an inclined angle with respect to the horizontal, and (b) an upper section for orienting the lids wherein the motion of the platforms is vertical. The platforms have a depth that is narrower than the depth of the lids, so that improperly oriented lids will fall from the platforms. The oriented lids are directed to a chute, where they are distributed for further processing.

In one embodiment of the invention means are provided to simultaneously orient and distribute more than one lid, in order to achieve a highly efficient operation. To this end, a partitioned distributing chute is provide and the oriented lids are directed to either but only one of the partitioned sections of the chute. The lids are prevented from contacting the end of the partition and clogging the apparatus, by means of a member that directs sidewardly, lids traveling toward the partition.

In one form of the invention, a pair of arcuate baffles are provided to direct the lids to the partitioned sections of the chute, whereby two simultaneously arriving lids will not both enter the partitioned section simultaneously.

A further explanation of an illustrative embodiment of the invention is provided in the following description and in the accompanying drawings in which:

FIGURE 2 is an enlarged side elevation, partially in section, of the hopper, conveyor and distributing chute;

Figure 1:
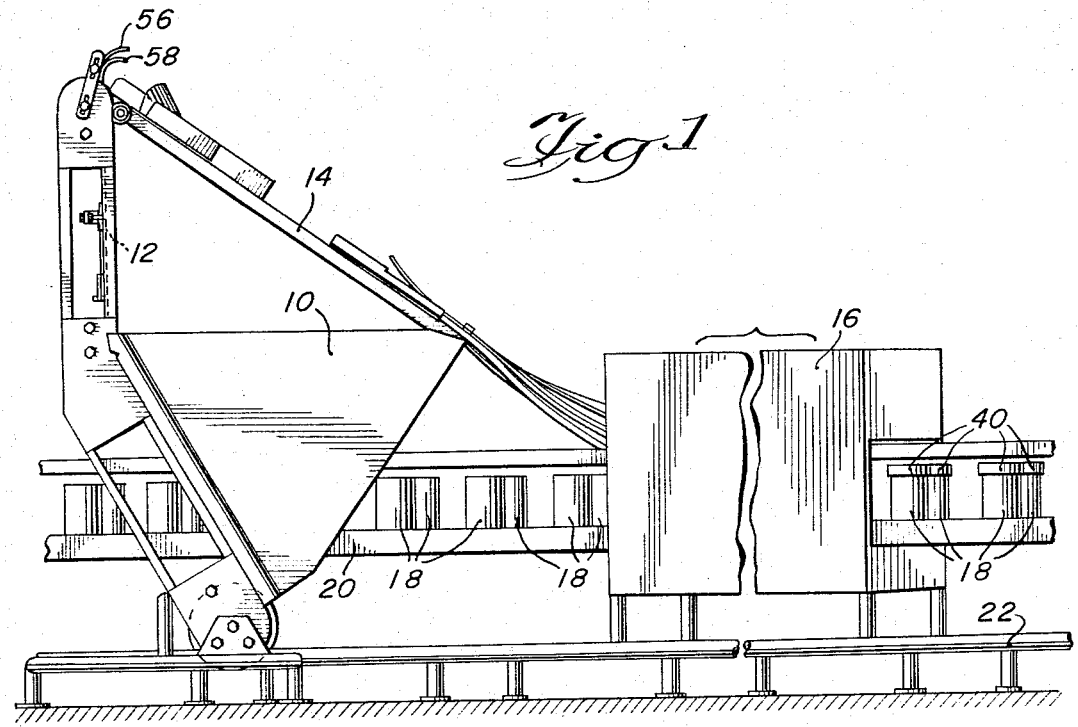
FIGURE 1 is an elevational view of a lid arrangement apparatus utilizing the principles of the present invention.

The apparatus shown in FIGURE 1 receives a large number of randomly oriented lids, orients the lids and distributes them for placement upon containers. The lids are dumped helter-skelter into a hopper 10 and some are continuously picked up and conveyed by horizontal platforms which move upwardly adjacent the hopper and a back member 12. The distance between the platforms and the back member is designed to orient the lids by assuring that only the lids having their closed side in juxtaposition with the back member will be balanced on the platforms, and the others will fall back into the hopper. A chute 14, which overlies the hopper 10, is provided to distribute the oriented lids to a capping apparatus 16. The uncapped containers 18 are fed to the capping apparatus by means of a conveyor 20.

As shown in FIGURES 2–5, the illustrated platforms for receiving and carrying the lids comprise a plurality of horizontally extending rods 22. The ends of the rods are connected to a pair of endless chain belts 24. The chain belts are driven by sprockets 26 which are keyed to a motor driven shaft 28, and the belts are also connected to idler sprockets 30, 32 and 34. Sprocket 26 is driven in the counterclockwise direction with respect to FIGURE 2 to move the rods 22 upwardly during the time they are carrying the lids.

The hopper 10 includes a wall 36 which is flat and extends to an angle of about 60° with respect to the horizontal. Back member 12 extends vertically and is connected to the upper end of wall 36 to form a continuous sheet. Horizontal rods 22 move upwardly through a path which includes the area adjacent the wall 36 and then the area adjacent the back member 12.

The container lids 40 which are randomly oriented in the hopper 10 are received by the moving rods and are lifted adjacent the hopper. As the rods move along wall 36, some will pick up no lids at all, some will receive only one lid and some will pick up more than one lid.

The distance of the rods from the hopper wall 36 and from the back member 12 is substantially less than the depth of a lid 40 so that when the rods move vertically the lid will not be balanced unless its closed side is juxtaposed with the back member 12. If the open side of the lid is communicating with the back member 12, the lid will be unbalanced, and at the intersection of the inclined hopper wall 36 and the vertical back member 12, it will tumble due to the force of gravity. The lid will fall back into the hopper 10 for subsequent reception by the conveyor and when it is subsequently lifted it will continue to fall back into the hopper unless the closed side is juxtaposed with the back member 12.

The method and apparatus of the present invention are very useful where a plurality of lids are to be simultaneously distributed to a plurality of containers. In the embodiment illustrated two container lids can be distributed to cap two containers simultaneously.

Chute 14 includes a pair of adjacent chute sections 44 and 46, having a partition 42 separating the two sections. It is desirable to prevent the lids from traveling along the center of the back wall 12 and contacting the end 49 of the partition 42, as this could cause clogging of the apparatus, particularly if several lids arrived at the chute simultaneously.

Figure 3:
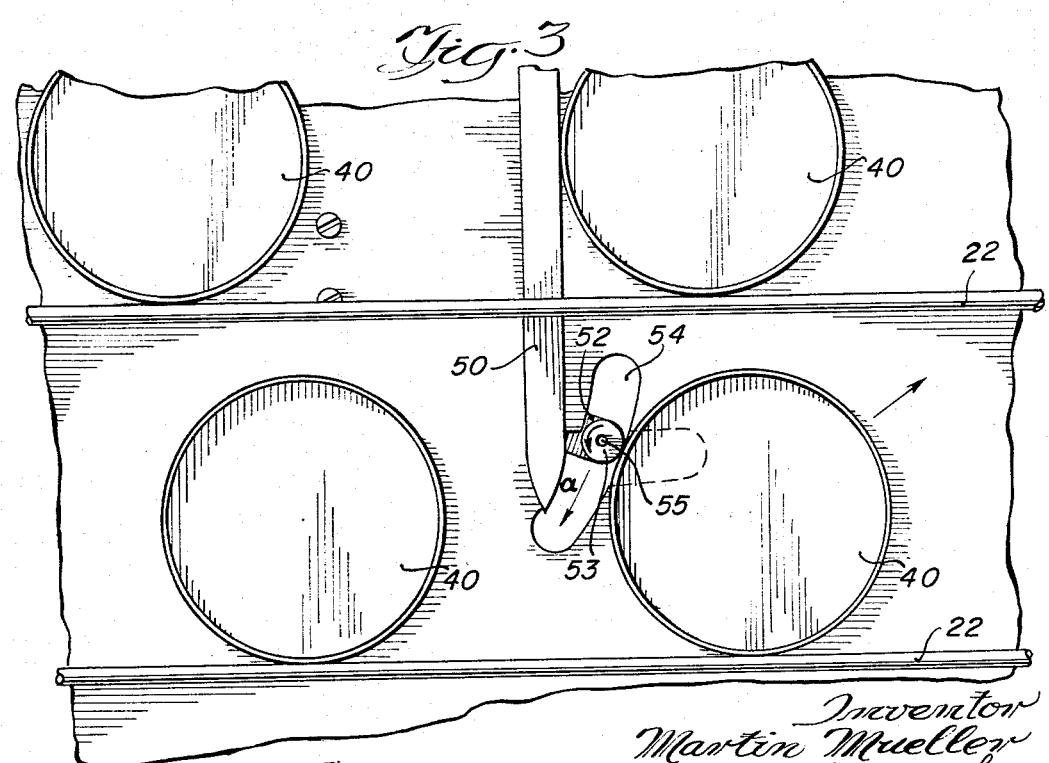
FIGURE 3 is a fragmentary front elevation of the dividing member and latch adjacent the conveyor.
Figure 4:
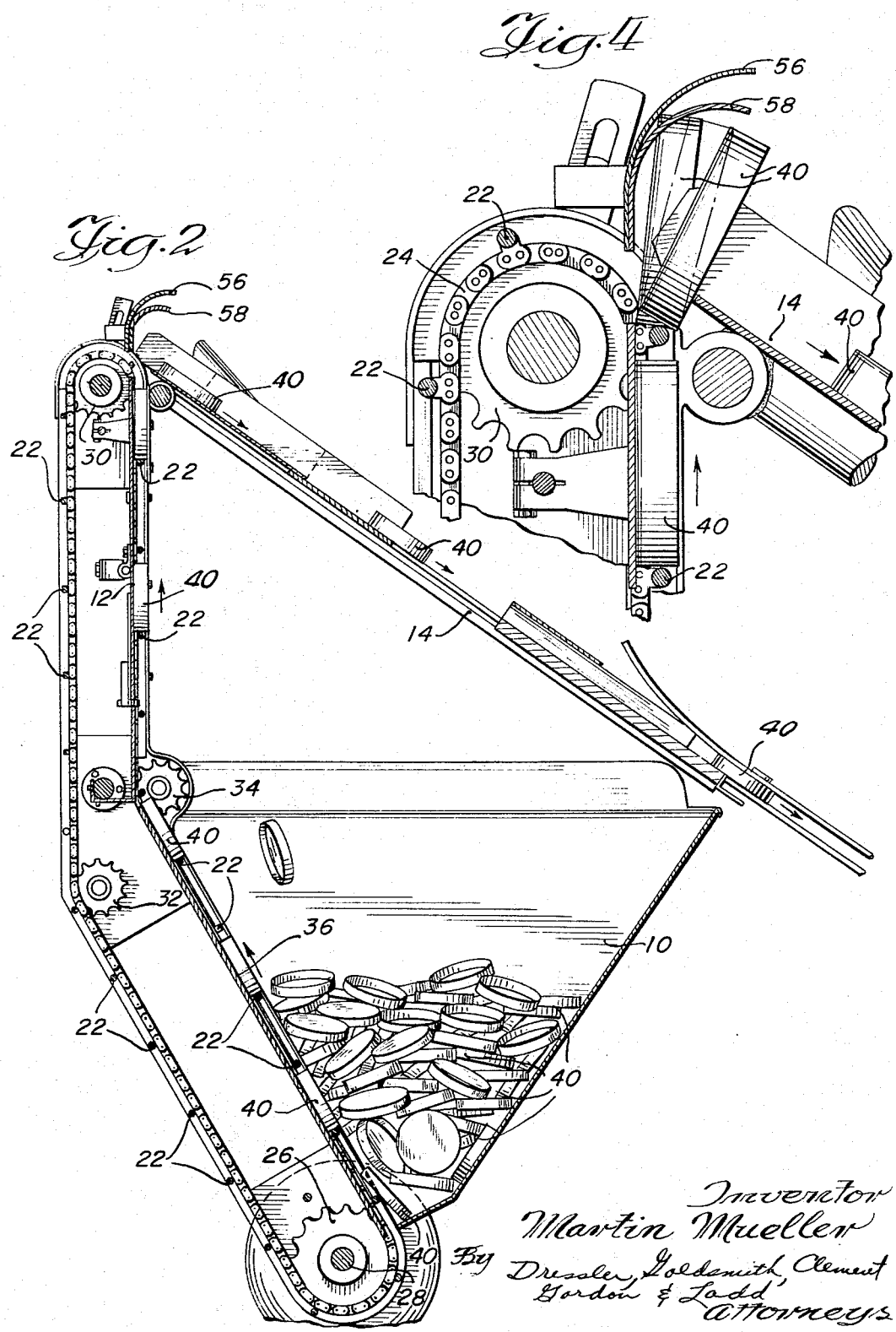
FIGURE 4 is a fragmentary enlarged side elevation, partially in section, showing the lids being directed from the conveyor to the distributing chute.
Figure 5:
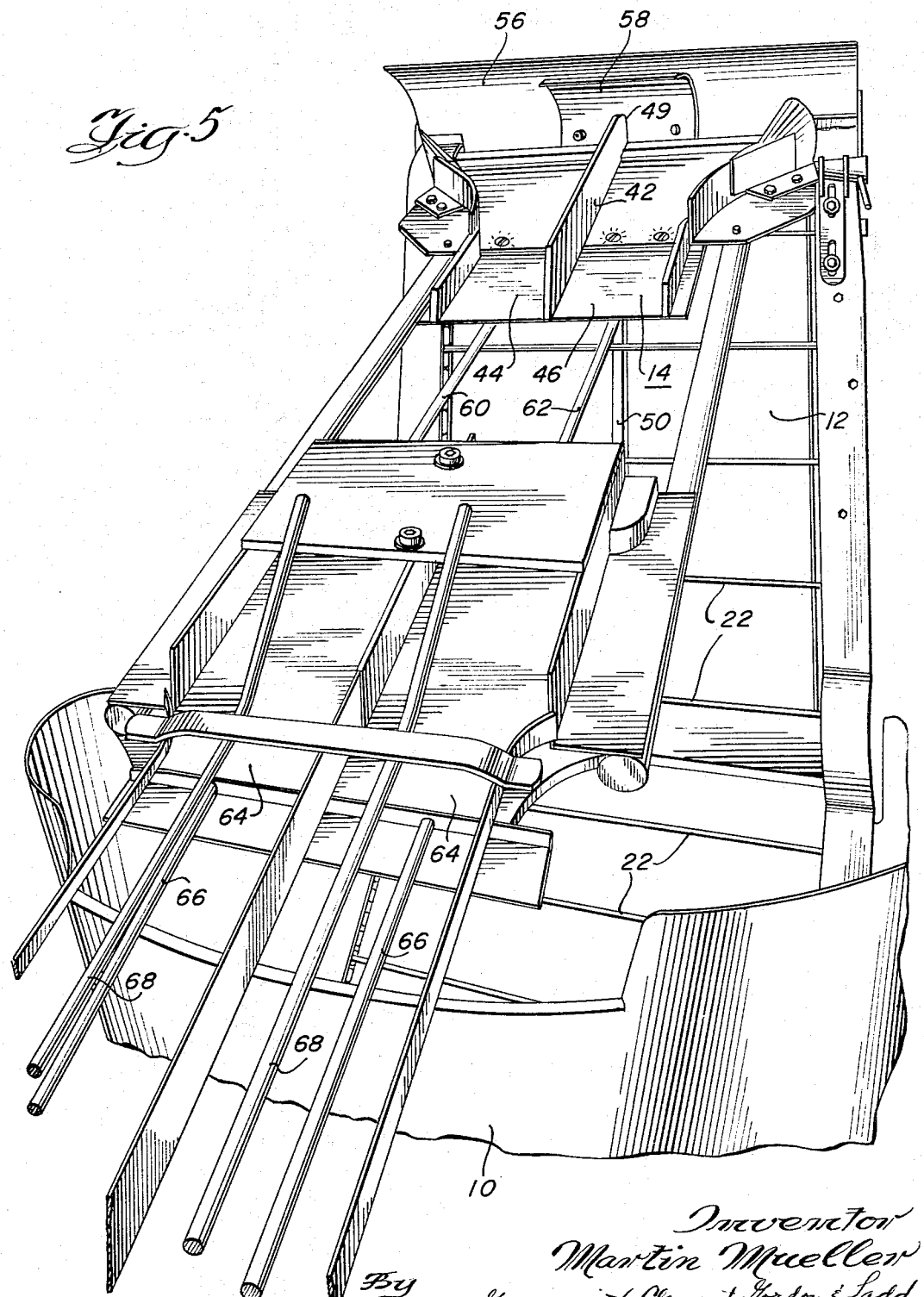
FIGURE 5 is a fragmentary perspective view of the distributing chute and the conveyor.

As shown most clearly in FIGURE 3, a dividing member 50 and a latch 52 are provided to urge lids traveling upwardly along the center of the back wall sidewards.

Dividing member 50 is aligned with partition 42 and extends from approximately the middle of wall 12, to which it is connected, to the top of the wall. The latch 52 extends through a slot 54 which is defined by the back wall 12, and it freely pivots in the direction of arrow a. Additionally, the head 53 of the latch 52 rotates about a pin 55. As a result of these expedients, the latch will yield when a vertically rising lid comes in contact therewith, and the head 53 will at the same time be rotated about the pin. Hence a lid which contacts the head 53 will be gently urged sidewardly and the chances of the lid overturning are substantially less than if the latch were not present.

Arcuate baffle 56 is provided to direct the lids from the rods to the chute. Occasionally two (or more) lids will arrive at one section of the partitioned chute 14 simultaneously. To prevent clogging of the apparatus, arcuate baffle 58 is provided to avoid clogging and to properly direct the lids into the respective sections of the chute. Baffle 58 is shorter in width than baffle 56 and the former is centered with respect to the partition 42. In this manner, if two (or more) lids enter one section of the chute 14 simultaneously, the lid which is closer to the partition 42 will contact baffle 58 before the other lid contacts baffle 56, and the centrally disposed lid will be urged into the respective chute section more rapidly than the lid which contacts baffle 56.

The double-baffle expedient is applicable to an apparatus which can simultaneously distribute two container lids. If the chute is partitioned into more than two sections, an increase in the number of baffles will be necessary.

The backup of lids, causing possible clogging of the machine, is prevented by means of rails 60 and 62 upon at least one of which the lids being distributed to the containers must slide. Rails 60 and 62 are smaller in diameter than the diameter of the lids, and, in this manner, if the lids have backeup so that oncoming lids are unable to rapidly slide along rails 60 and 62, the lids then cannot balance on the rails and will instead fall into the hopper 10.

Since the lids 40 have been oriented prior to their motion along the chute 14, all of the lids will have their skirts directed downwardly and their open sides in communication with the chute. The lids, after sliding along rails 60 and 62, are directed to the conveyor 20 via channels 64 and lower rails 66. Overlying rods 68 are provided to urge the lids downwardly once they contact the container opening and the lids are automatically placed upon the container as it travels via the conveyor 20.

The operation of the illustrated lid orienting apparatus is as follows:

The operator dumps a large number of lids into the hopper 10 where they lie in random orientation. Some of the lids are engaged by the moving horizontal rods 22 and are raised along the inclined rear wall 36 of the hopper. The lift becomes vertical as the rails move adjacent to the back wall 12. As the lids move from an inclined position to the vertical position, the lids having their open side in communication with the back wall 12 will not balance on the rails and will tumble back into the hopper 10.

Lids traveling along the approximate center of the back wall 12 will be urged sidewards by means of pivotable latch 52 positioned adjacent dividing member 50. In this manner the lids will be directed to either a first section 44 or a second section 46 of the distributing chute 14, and will not contact the end of the partition 42 to clog the device. If more than one lid arrives simultaneously in either one of the chute sections, the lid which is closest to the partition 42 will be first directed into the chute due to arcuate baffle 58 which is positioned forwardly with respect to arcuate baffle 56. The baffles direct the oriented lids to the chute 14 whereby the open side of the lids will communicate with the chute.

To enter the capping apparatus 16, the lids must slide down either rail 60 or 62 and travel along channel 64 and lower rail 66. If there is a backup of lids along the chute, clogging of the apparatus is prevented by means of rails 60 and 62 which will not balance lids that are not sliding thereupon. Hence the backed up lids will fall back into the hopper.

From the foregoing, it is seen that a method and apparatus have been provided to automatically orient a plurality of lids and to simultaneously distribute two or more lids to receptive containers. The apparatus includes many safety features which prevent its clogging and enhance the efficiency of the operation.

Although an illustrative embodiment has been shown and described it is to be understood that various modifications and substitutions may be made without departing from the novel spirit and scope of the present invention.

What is claimed is:

1. An apparatus for unscrambling and orienting container lids, each of said lids having a closed side and a skirt member depending therefrom to frame an open side which comprises: a hopper for containing a plurality of lids, one wall of the hopper being substantially flat and extending at an inclined angle with respect to the horizontal; a back member above said wall having a substantially vertical planar surface connected in continuous relationship with said wall; lid conveying means associated with said hopper for conveying the lids contained therewithin, said conveying means including a plurality of horizontally extending platforms in parallel with one another; driving means connected to said platforms for moving said platforms upwardly parallel to said one wall for receiving the lids and thereafter upwardly parallel to said back member for orienting the lids, said moving platforms extending from said back member at a distance which is farther from said back member than the center of gravity of said lids when said lids have their closed sides facing said back member and nearer to said back member than the center of gravity of said lids when said lids have their open sides facing said back member, whereby improperly oriented lids will fall from said platforms; and means for distributing the oriented lids from said conveying means to a delivery station.

2. An apparatus for unscrambling and orienting container lids which comprises: a hopper for containing a plurality of lids, at least one wall of the hopper being substantially flat and extending at an inclined angle with respect to the horizontal; a back member above said wall having a substantially vertical, planar surface connected in continuous relationship with said one wall; lid conveying means associated with said hopper for conveying the lids contained therein, said conveying means including a plurality of horizontally extending rods in parallel with one another; a pair of endless chains connected to said rods for moving said rods upwardly parallel to said one wall for receiving the lids and upwardly parallel to said back member for orienting the lids, said moving rods being located at a distance with respect to said back member that is shorter than the depth of the lids whereby an improperly oriented lid will fall into said hopper; means for distributing the oriented lids from said conveying means to a delivery station, said distributing means including a partitioned chute connected adjacent said conveying means and at least partially overlying said hopper; and means for directing the lids from said conveying means to said distributing means.

3. An apparatus for unscrambling and orienting container lids which comprises: a hopper for containing a plurality of lids; lid conveying means associated with said hopper for conveying the lids contained therein, said conveying means including a plurality of horizontally extending rods in parallel with one another; a pair of endless chains connected to said rods for moving said rods upwardly through a path including (a) a lower section for receiving said lids wherein the motion of said rods is at an inclined angle with respect to the horizontal and (b) an upper section for orienting said lids wherein the motion of said rods is vertical; a back member having a vertical planar surface, positioned adjacent said rods, said rods being located at a distance with respect to said back member that is shorter than the depth of the lids whereby an improperly oriented lid will fall into said hopper; means centrally located with respect to said back member for directing lids which contact said centrally located means in a sideward direction whereby the lids raised by said conveyor means will be disposed in either but only one of two adjacent areas along the plane of said back member; means for distributing the oriented lids from said conveying means to a delivery station, said distributing means including a partitioned chute connected adjacent said conveying means and at least partially overlying said hopper, said chute extending downwardly and including means for preventing the lids from backing up along the chute, a portion of the chute upon which the lids must slide being substantially smaller than the lid diameter whereby only lids that can slide rapidly along said portion will be balanced thereupon; and means for directing the lids from said conveying means to said distributing means.

4. An apparatus for unscrambling and orienting container lids which comprises: a hopper for containing a plurality of lids; lid conveying means associated with said hopper for conveying the lids contained therein, said conveying means including a plurality of horizontally extending rods in parallel with one another; a pair of endless chains connected to said rods for moving said rods upwardly through a path including (a) a lower section for receiving said lids wherein the motion of said rods is at an inclined angle with respect to the horizontal and (b) an upper section for orienting the lids wherein the motion of said rods is vertical; a back member having a vertical planar surface positioned adjacent said rods, said rods being located at a distance with respect to said back member that is shorter than the depth of the lids whereby an improperly oriented lid will fall into said hopper; a dividing member connected to said back member for directing lids which contact said dividing member in a sideward direction whereby the lids raised by said conveyor means will be disposed in either but only one of two adjacent areas along the plane of said back member, a pivotable latch positioned adjacent said dividing member and adapted to yield laterally in the direction of said dividing member when a vertically rising lid comes into contact therewith; means for distributing the oriented lids from said conveying means to a delivery station, said distributing means including a partitioned chute connected adjacent said conveying means and at least partially overlying said hopper; and means for directing the lids from said conveying means to said distributing means.

5. An apparatus for unscrambling and orienting container lids which comprises: a hopper for containing a plurality of lids, lids conveying means associated with said hopper for conveying the lids contained therein, said conveying means including a plurality of horizontally extending platforms in parallel with one another; means connected to said platforms for moving said platforms upwardly through a path including (a) a lower section for receiving said lids wherein the motion of said platforms is at an inclined angle with the horzontal and (b) an upper section for orienting said lids wherein the motion of said platforms is vertical; means for distributing the oriented lids from said conveying means to a delivery station, said distributing means including a partitioned chute connected adjacent said conveying means; and means for directing the lids from said conveying means to said distributing means, said directing means comprising a first arcuate baffle and a second arcuate baffle positioned in front of said first baffle w.th respect to said chute, said second baffle having a smaller horizontal length than said first baffle, whereby lids contacting said second baffle will be directed to said chute more rapidly than lids contacting said first baffle.

6. A lid arrangement apparatus which comprises: means for conveying a plurality of lids; a chute connected adjacent said conveying means for distributing said lids; a baffle system for directing to said chute lids which simultaneously arrive at said chute from said conveying means comprising a first baffle adapted for directing lids coming in contact therewith to a first portion of said chute, a second baffle adapted for directing lids coming in contact therewith to a second portion of said chute, said second baffle being positioned in front of said first baffle with respect to said chute, whereby lids contacting said second baffle will be directed to said chute more rapidly than lids contacting said first baffle.

7. The lid arrangement apparatus of claim 6 wherein said first and said second baffles are arcuate in shape.

References Cited by the Examiner
UNITED STATES PATENTS

| | | | |
|---|---|---|---|
| 2,609,912 | 9/1952 | Engel | 198—33 |
| 2,916,133 | 12/1959 | Copping | 198—30 |
| 2,922,548 | 1/1960 | Anderson | 221—156 |

EVON C. BLUNK, *Primary Examiner.*

RICHARD E. AEGERTER, *Examiner.*